United States Patent [19]

Kim

[11] Patent Number: 4,679,745
[45] Date of Patent: Jul. 14, 1987

[54] REEL BRAKE DEVICE OF A VIDEOCASSETTE RECORDER

[75] Inventor: Kyo S. Kim, Kwachon, Rep. of Korea

[73] Assignee: Gold Star Co., Ltd., Seoul

[21] Appl. No.: 881,672

[22] Filed: Jul. 3, 1986

[30] Foreign Application Priority Data

Jul. 3, 1985 [KR] Rep. of Korea ............ 8220/1985[U]

[51] Int. Cl.⁴ ............................................. B65H 23/06
[52] U.S. Cl. .................................... 242/75.4; 242/204; 188/163; 188/336; 188/249; 192/18 B; 192/84 T
[58] Field of Search .................. 242/75.4, 75.43–75.47, 242/99, 107.3, 156.2, 129.8, 204; 188/163, 336, 250 H, 259, 249; 192/18 B, 89 B, 74, 78, 84 T

[56] References Cited

U.S. PATENT DOCUMENTS

| | | | |
|---|---|---|---|
| 1,340,710 | 5/1920 | Graham | 242/75.4 |
| 3,153,515 | 10/1964 | Scully et al. | 242/204 |
| 3,233,710 | 2/1966 | Daniels | 192/18 B X |
| 3,289,969 | 12/1966 | Purbaugh | 242/107.3 |
| 3,630,332 | 12/1971 | Price | 188/336 X |
| 3,640,363 | 2/1972 | Spalding | 242/107.3 X |
| 3,664,609 | 5/1972 | McMillin | 242/75.4 X |

Primary Examiner—John M. Jillions
Attorney, Agent, or Firm—Birch, Stewart, Kolasch & Birch

[57] ABSTRACT

A reel brake device for use in a video-cassette recorder comprises a solenoid mounted on a base plate of a deck of the recorder and arranged around a reel shaft erected on the base plate, and a moveable core wire disposed between the solenoid and the reel shaft and below a reel table rotatably supported to an upper portion of the reel shaft, the core wire being actuated by the solenoid. The device further comprises: a disc shaped supporting plate fixedly fitted, to a middle portion of the reel shaft; a funnel-shaped elastic member disposed just below the supporting plate and slideably fitted to the reel shaft, the elastic member contacting with the lower surface of the supporting plate and the moveable core wire, the elastic member also having a slit so as to be radially expanded in the widening of the slit caused by the upward movement of the moveable core wire; and a brake ring radially spaced from the inner side surface of the reel table, the brake ring having an annular recess receiving each outer peripheral edge of the supporting plate and elastic member, the brake ring also having a slit radially extending throughout the width thereof, so as to be radially expanded by the expansion of the elastic member, whereby the outer surface of said brake ring can be contacted with the inner side surface of the reel table, in order to brake the rotation of the reel.

1 Claim, 5 Drawing Figures

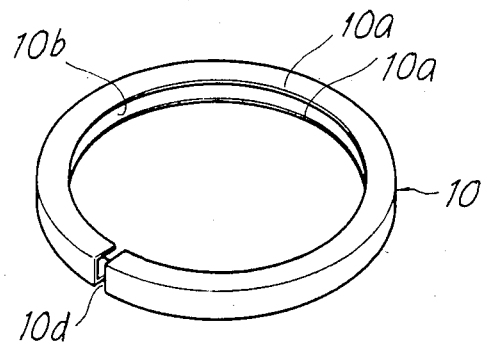
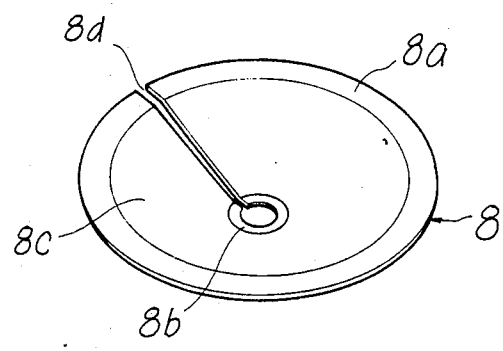

REEL BRAKE DEVICE OF A VIDEOCASSETTE RECORDER

BACKGROUND OF THE INVENTION

The present invention relates to a reel brake device of a video cassette recorder, and particularly to a reel brake device of a videocassette recorder wherein a brake ring and an elastic member are disposed between a bottom surface of a reel table supported at an upper portion of a reel shaft and a moveable core wire adapted to be actuated by a solenoid so that they are operated by a vertical movement of the moveable core wire, thereby enabling the rotation of the reel table to be controlled.

A general videocassette recorder (hereinafter, referred to as a VCR) comprises a reel brake device adapted to stop a rotation of a reel table by applying a proper brake to the reel table according to the change of the function mode of the VCR.

For example, a conventional reel brake device which is shown in FIG. 5 comprises a solenoid 3' placed on a base plate 2' of a reel table 1' and provided with a fixed core wire 4' disposed around a lower portion of a reel shaft 5', a moveable core wire 6' disposed around an upper portion of the reel shaft 5', and a brake plate 7' supported to said moveable core wire 6' to move together therewith. When a magnetic force is generated by the fixed core wire 4' of the solenoid 3', the moveable core wire 6' is pulled down by the magnetic force, thereby causing the brake plate 7' to be moved downwardly. This downward movement of the brake plate 7' causes sliding members 7'a radially formed on the lower surface of the outer portion of the brake plate 7' to contact with contact members 1'a formed on the upper surface of the wall inwardly extended from the outer wall of the reel table 1'. Thus, the rotation of the reel table 1' can be stopped.

In such conventional reel brake device, however, the core wires 4' and 6' are disposed around the lower and upper portions of the reel shaft 5', respectively. And also, a plurality of contact members 1'a, each adapted to contact with each sliding member 7'a of the brake plate 7' are integrally formed with the inwardly extended wall of the reel table 1'. Furthermore, a coil spring 8' is disposed between the brake plate 7' supported to the upper end of the moveable core wire 6' and the solenoid 3' to upwardly return the moveable core wire 6' and the brake plate 7'. Due to such complex construction of the device, the number of parts are increased, thereby causing the assembly thereof to be troublesome. As a result, this conventional device encounters problems of an increased manufacture cost and a lower productivity.

SUMMARY OF THE INVENTION

Therefore, an object of the present invention is to provide an improved reel brake device overcoming the above-mentioned problems encounted in the prior art.

In accordance with the present invention, this object can be accomplished by providing a reel brake device of a video-cassette recorder, comprising a solenoid mounted on a base plate of a deck of the recorder and arranged around a reel shaft erected on said base plate to be radially spaced from said reel shaft, and a moveable core wire disposed between said solenoid and said reel shaft and below a reel table rotatably supported to an upper portion of said reel shaft, said core wire being actuated by said solenoid, the device being characterized by further comprising: a disc-shaped supporting plate fixedly fitted, at the opened center portion thereof, to a middle portion of said reel shaft and spaced from a lower surface and inner side surface of said reel table; a funnel-shaped elastic member disposed just below said supporting plate and slideably fitted, at the opened center portion thereof, to said reel shaft, said elastic member having at outer and inner peripheral edges thereof flat portions one contacting with the lower surface of said supporting plate and the other supporting said moveable core wire, respectively, said elastic member also having a slit radially extended between said outer and inner peripheral edges thereof, so as to be radially expanded in the widening of said slit caused by the upward movement of said moveable core wire; and a brake ring disposed between the inner side surface of said reel table and said supporting plate and radially spaced from the inner side surface of said reel table, said brake ring having an annular recess receiving each outer peripheral edge of said supporting plate and elastic member, said brake ring also having a slit radially extending throughout the width thereof, so as to be radially expanded by the expansion of said elastic member, whereby the outer surface of said brake ring can be contacted with the inner side surface of the reel table, in order to brake the rotation of the reel.

As apparent from the above description, the arrangement of the present invention eliminates the use of a fixed core wire for upwardly moving the moveable core wire and a coil spring for downwardly returning said moveable core wire. And also, there is no necessity of forming contact members at the reel blake plate. Thus, the whole construction of the reel brake device is simplified in accordance with the present invention.

Since the elastic member is uniformly expanded at all outer peripheral edges thereof as the moveable core wire is upwardly moved by the actuation of the solenoid, the brake ring can be instantly and simultaneously contacted, at all outer surfaces thereof, with all contact areas of the inner side surface of the reel table, so that the rotation of the reel table can be rapidly and instantly controlled. And also, uniform frictional forces are generated throughout all contact areas between a frictional plate attached to the brake ring and the inner side surface of the reel table, thereby enabling a braking efficiency to be improved and the life of the device to be lengthened in virtue of a reduction of the wear of the frictional plate.

Further objects and advantages of the present invention will be understood from the following detailed description of a preferred embodiment of the present invention, referring to the annexed drawings.

BRIEF DESCRIPTION OF THE DRAWINGS

FIG. 3 is a perspective view of a brake ring in accordance with the present invention;

FIG. 4 is a perspective view of an elastic member in accordance with the present invention.

DETAILED DESCRIPTION OF THE PREFERRED EMBODIMENT

Figure 1:
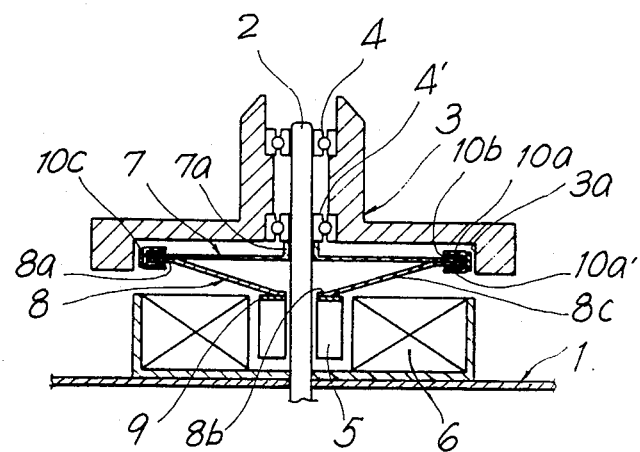
FIG. 1 is a sectional view of a reel brake device in accordance with the present invention.
Figure 2:
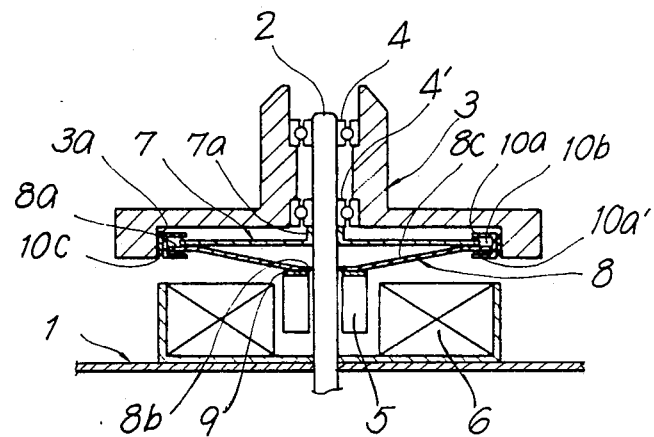
FIG. 2 is a sectional view similar to FIG. 1, showing a braking operation of the reel brake device in accordance with the present invention.
Figure 5:
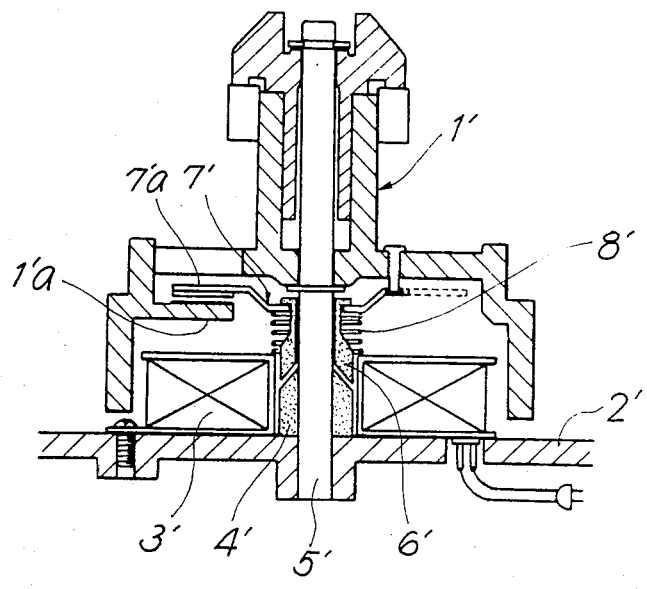
FIG. 5 is a sectional view of a reel brake device of the prior art.

Referring to FIG. 1, a reel shaft 2 is vertically supported on a base plate 1 of a deck of recorder (not shown). A reel table 3 is supported to the upper portion of the reel shaft 2, by means of upper and lower ball bearings 4 and 4', to freely rotate with regard to the reel shaft 2. A moveable core wire 5 is disposed around the lower portion of the reel shaft to be vertically moveable. Around the moveable core wire 5, a solenoid coil 6 is fixedly mounted on the base plate 1. The solenoid coil 6 functions to upwardly move the core wire 5, in a well-known manner.

To the middle portion of the reel shaft 2, a disc-shaped supporting plate 7 having a center hole is fixedly fitted. The supporting plate 7a has a boss 7' upwardly protruded from the peripheral edge of the center hole thereof, and contacted with the lower surface of the lower bearing 4'. By the boss 7', the supporting plate 7a maintains a certain space from the lower surface of the reel table. And also, the outer peripheral edge of the supporting plate maintains a certain space from the inner side surface 3a of the reel table 3.

Just below the supporting plate 7, a funnelshaped elastic member 8 having a center hole is fitted to the reel shaft 2, as shown in FIG. 1. The elastic member 8 has flat portions 8a and 8b at outer and inner peripheral edges thereof, respectively. The outer flat portion 8a of the elastic member 8 has a diameter substantially identical to that of the supporting plate 7 and contacts with the lower surface of the supporting plate 7 to radially slide along said lower surface. To the lower surface of the flat portion 8b of the elastic member 8, the moveable core wire 5 is fixedly mounted by means of a plate 9 being fixed to the lower surface of said flat portion 8b and having a diameter identical to that of said moveable core wire 5.

As shown in FIG. 4, the elastic member 8 also has a slit 8d radially extended between the outer and inner peripheral edges thereof and along the inclined portion 8c thereof. As the moveable core wire 5 is upwardly moved by the actuation of the solenoid 6, the slit 8d of the elastic member 8 becomes wider, thereby causing the elastic member 8 to be radially expanded.

An annular brake ring 10 is disposed between the inner side surface of the reel table 3 and the supporting plate 7. The brake ring 10 has an annular recess 10b defined by upper and lower supporting portions 10a and 10a' thereof and adapted to receive each outer edge of the supporting plate 7 and the elastic member 8. To the outer surface of side wall of the brake ring 10, a frictional plate 10c is attached. A certain space is maintained between the frictional plate 10c and the inner side surface 3a of the reel table 3. In similar manner to the elastic member 8, the brake ring 10 has a slit 10d extended radially throughout the width thereof, as shown in FIG. 3. During the expansion of the elastic member 8, accordingly, the brake ring 10 is radially expanded such that the frictional plate 10c contacts with the inner side surface 3a of the reel table 3, to brake the rotation of the reel table.

Now, the operation of the present brake device will be described in detail.

FIG. 1 shows when a brake force is not applied to the reel table 3. In this state, the reel table 3 freely rotates, because the frictional plate 10c of the brake ring 10 maintains a certain space from the inner side surface 3a of the reel table 3.

When solenoid coil 6 is energized by the change of the functional mode from the above-mentioned state, in order to apply a required brake force to the reel table 3, a magnetic force is generated to upwardly move the moveable core wire 5. By this upward movement of the core wire 5, the lower end, that is the flat portion 8b of the elastic member 8 is urged to be upwardly moved, causing the slit 8d of the elastic member 8 to become wider. Due to the widening of the slit 8d, the elastic member 8 is radially expanded, so that the outer peripheral edge thereof is outwardly moved to urge outwardly and radially the brake ring 10, thereby causing the slit 10d to be widened. Due to the widening of the slit 10d, the brake ring 10 is radially expanded, so that the frictional plate 10c close contacts with the inner side surface 3a of the reel table 3 to generate a frictional force therebetween, thereby enabling the rotation of the reel table 3 to be controlled by the frictional force.

On the other hand, if the magnetic force of the solenoid disappears, the raised moveable coil wire is downwardly moved by virtue of the weight thereof. As a result, the elastic member 8 and the brake ring 10 return to their original positions of FIG. 1 by the narrowing of the slits 8d and 10d, respectively.

As apparent from the above description, the reel brake device of the present invention comprises a simple construction involving the elastic member and the brake ring each of which include a slit eliminating the use of a return spring. As a result, the brake and return operations can be smoothly carried out, thereby enabling a braking efficiency to be improved. In virtue of a reduction of the wear of the frictional plate, the life of the brake device can be lengthened. And also, it enables to improve the productivity and to reduce the manufacturing cost, in virtue of a simple construction. In addition, a compact device can be provided.

What is claimed is:

1. A reel brake device of a videocassette recorder, comprising a solenoid mounted on a base plate of a deck of the recorder and arranged around a reel shaft erected on said base plate to be radially spaced from said reel shaft, and a moveable core wire disposed between said solenoid and said reel shaft and below a reel table rotatably supported to an upper portion of said reel shaft, said core wire being actuated by said solenoid, the device being characterized by further comprising:

a disc-shaped supporting plate, fixedly fitted at the opened center portion thereof, to a middle portion of said reel shaft and spaced from a lower surface and inner side surface of said reel table;

a funnel-shaped elastic member disposed just below said supporting plate and slideably fitted, at the opened center portion thereof, to said reel shaft, said elastic member having at outer and inner peripheral edges thereof flat portions one contacting with the lower surface of said supporting plate and the other supporting said moveable core wire, respectively, said elastic member also having a slit radially extended between said outer and inner peripheral edges thereof, so as to be radially expanded in the widening of said slit caused by the upward movement of said moveable core wire; and a brake ring disposed between the inner side surface of said reel table and said supporting plate and radially spaced from the inner side surface of said reel table, said brake ring having an annular recess receiving each outer peripheral edge of said supporting plate and elastic member, said brake ring also having a slit radially extending throughout the width thereof, so as to be radially expanded by the expansion of said elastic member, whereby the outer surface of said brake ring can be contacted with the inner side surface of the reel table, in order to brake the rotation of the reel.

* * * * *